United States Patent
Diehr et al.

[15] 3,644,228
[45] Feb. 22, 1972

[54] PROCESS FOR THE PRODUCTION OF SYNTHETIC RESINS WHICH CONTAIN URETHANE GROUPS

[72] Inventors: Hans Joachim Diehr; Rudolf Merten; Konrad Uhlig, all of Leverkusen, Germany

[73] Assignee: Farbenfabriken Bayer Aktiengesellschaft, Leverkusen, Germany

[22] Filed: Jan. 19, 1970

[21] Appl. No.: 4,028

[30] Foreign Application Priority Data

Jan. 29, 1969 Germany..................P 19 04 232.1

[52] U.S. Cl..............260/2.5 AJ, 260/2.5 AM, 260/75 NQ, 260/75 NR, 260/77.5 AQ, 260/77.5 AR, 260/DIG. 24
[51] Int. Cl..........................................C08c 17/08
[58] Field of Search..............260/2.5 AM, 2.5 AJ, 77.5 AM, 260/75 NM, 77.5 SS, 77.5 NQ, 77.5 NR, 75 NQ, 75 NR

[56] References Cited

UNITED STATES PATENTS

| | | | |
|---|---|---|---|
| 3,491,067 | 1/1970 | Sellet | 260/77.5 X |
| 3,397,184 | 8/1968 | Heydkamp | 260/2.5 X |
| 3,240,729 | 3/1966 | Hoye | 260/2.5 |
| 3,222,305 | 12/1965 | Lanham | 260/2.5 |
| 3,061,557 | 10/1962 | Hostettler | 260/2.5 |
| 3,255,131 | 6/1966 | Ahlbrecht | 260/77.5 X |
| 3,385,801 | 5/1968 | Birum | 260/2.5 |

*Primary Examiner*—Donald E. Czaja
*Assistant Examiner*—C. Warren Ivy
*Attorney*—Robert A. Gerlach and Sylvia Gosztonyi

[57] ABSTRACT

A process is provided for the production of synthetic urethane resins from polyhydroxyl compounds, polyisocyanates organic, flame protective agents and, if desired; blowing agents and other additives in which N-methylol compounds of the structure

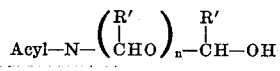

are employed wherein the Acyl radical represents a $-COH$, $-COR''$, $-COOR''$, $-SO_2R''$, $-SO_2R'''$ or $-PO(OR'')_2$ radical in which $R''$ is a $C_1$ to $C_{18}$ alkyl radical and $R'''$ is a $C_6$ to $C_{14}$, preferably $C_6$, aryl radical, R and R' are hydrogen or a $C_1$ to $C_4$ alkyl radical and $n$ is an integer of 1 to 3 are used in a quantity of from about 1 to about 20 percent by weight based on the quantity of polyisocyanate.

7 Claims, No Drawings

PROCESS FOR THE PRODUCTION OF SYNTHETIC RESINS WHICH CONTAIN URETHANE GROUPS

Urethane containing synthetic resins having a wide variety of different types of physical properties, and particularly foam urethane resins, can be prepared by the isocyanate polyaddition process. In the polyaddition reaction compounds containing at least two hydrogen atoms reactive with isocyanate groups, particularly hydroxyl and carboxyl groups, are reacted with polyisocyanates in the presence of activators, stabilizers and other additives. In those cases in which a foam plastic is to be prepared, water and/or other blowing agents are added to the formulation in order to impart a cellular structure to the final product.

In the production of polyurethane resins, including foams, it had been known heretofore to add components to the reaction mixture which would impart some degree of nonflammability to the final product, even to the extent that the product becomes self-extinguishing. The flame inhibiting substances which have been used are generally compounds which contain phosphorus, halogen atoms, antimony and the like, either alone or in combination with other additives. The flame retardants which have been employed are of two distinct types: those which will build into the polymeric structure and those which are present merely in admixture with the polymer. In the first case, the additives contain functional groups which react with components of the polyurethane reaction mixture with the result that the additive becomes built into the synthetic resin structure; examples of some such compounds include halogenated isocyanates, phosphoric esters and so on. The additives of the second group are present merely in admixture with the polymers because they do not contain functional groups; examples of some such additives include halogenated hydrocarbons, phosphorus compounds which do not contain functional groups and so on. When a sufficient quantity of such additives are employed to ensure that the polymer is substantially nonflammable, the mechanical properties of the resin become impaired.

It is, therefore, an object of this invention to provide flame resistant polyurethanes and a method for their preparation which are substantially devoid of the foregoing disadvantages.

It is a further object of this invention to provide flame resistant polyurethanes and a process for their production wherein the flame proofing ability of prior art flame retarding additives is significantly increased and even often doubled.

Another object of this invention is to provide flame resistant polyurethanes which have improved mechanical properties and a process for preparing them.

An additional object of this invention is to provide nonflammable polyurethane foam products which are especially useful in the production of hard, semihard and flexible molded foam products.

The foregoing objects and others which will become apparent from the following description are accomplished in accordance with this invention, generally speaking, by providing polyurethane resins and a process for preparing them in which polyhydroxyl compounds are reacted with organic polyisocyanates in the presence of a flame-retarding additive and, if desired, a blowing agent and other additives wherein from about 1 to about 20 percent, preferably 1 to 15 percent, by weight based on the quantity of organic polyisocyanate present of an N-methylol compound having the structure

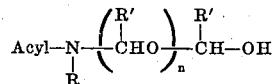

is employed in which the Acyl radical is a —COH, —COR″, —COOR″, —SO₂R″, —SO₂R‴ or —PO(OR″)₂ radical wherein R″ is an alkyl radical having one to 18 carbon atoms such as, for example, methyl, ethyl, propyl, butyl, hexyl, octyl, undecyl, tetradecyl, octadecyl and the like, and R‴ is an aryl radical having six to 14 carbon atoms such as, for example, phenyl, naphthyl, benzyl, indyl, phenanthryl, anthryl and the like, but preferably phenyl, R and R′ represent hydrogen atoms or an alkyl radical having one to four carbon atoms such as, for example, methyl, ethyl, propyl, butyl, and $n$ is an integer of 1 to 3.

Surprisingly, it has been found that the flame resistance of polyurethane resins, particularly polyurethane foams, which contain flame proofing agents known in the art can be considerably improved when the N-methylol compounds of this invention are added to the polyurethane mixture. Indeed, in the torch test of polyurethane foams produced in accordance with this invention, the complete combustion times for the polyurethanes of this invention are substantially increased and often even doubled when compared to polyurethane foams produced from identical reaction mixtures which do not contain the N-methylol of this invention. Even further, a demonstrable improvement can be observed in the mechanical properties of polyurethane products produced in accordance with this invention. Due to their free hydroxy groups the N-methylol compounds react with the polyisocyanate under formation of urethane groups.

The N-methylol compounds of this invention can usually be prepared from amides having the formula

wherein R and Acyl are as already defined. These amides are heated to the melting point, e.g., to 60–240 preferably 100° to 200° C. in the presence of basic compounds such as alkali metal hydroxides, alkali metal carbonates and alkaline earth metal oxides, with aldehydes of the formula

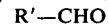

in which R′ is as already defined. Examples of some such aldehydes include paraformaldehyde, trioxane, acetaldehyde, propionaldehyde, butyraldehyde and the like and preferably those which contain one to six carbon atoms. Some suitable amides which may be used as starting materials in the preparation of the N-methylol compounds of this invention include alkyl and aryl amides such as acetamide, chloroacetamide, dichloroacetamide, butyramide, dodecanecarboxylic acid amide, octadecanecarboxylic acid amide, benzamide, 4-chlorobenzamide, a-naphthoic acid amide, formamide, benzene sulphonic acid amide, p-toluenesulphonic acid amide, methanesulphonic acid amide, phosphoric acid diethyl ester amide, N-methylacetamide, N-butylacetamide, N-methylbenzamide, N-butylbenzamide, N-butylbenzenesulphonic acid amide, N-methylmethanesulphonic acid amide and the like and preferably those which contain one to 20 carbon atoms. The preferred methylol compounds are those which can be easily dosed and mixed with the other reactants, and, hence, those which are liquid at room temperature.

Suitable polyhydroxyl compounds to be used in the practice of this invention usually have molecular weights of from about 800 to about 3,000 including polyesters, polyethers, polythioethers, polyester amides and the like which contain several hydroxyl groups such as those known for the production of homogeneous or cellular polyurethanes and disclosed in U.S. Pat. No. 3,201,372. Suitable hydroxyl polyesters are, for example, reaction products of polyhydric alcohols with polybasic carboxylic acids. Instead of the free carboxylic acids, the corresponding polycarboxylic acid anhydrides, polycarboxylic acid esters or mixtures of these compounds may be used for the preparation of the hydroxyl polyesters. The polycarboxylic acids may be aliphatic, cycloaliphatic, aromatic or heterocyclic compounds and may be substituted and/or unsaturated. Succinic acid, adipic acid, sebacic acid, phthalic acid, phthalic acid anhydride, maleic acid, maleic acid anhydride, monomeric, dimeric and trimeric fatty acids, dimethylterephthalate and the like are given as individual examples.

The alcohol component may, for example, be ethylene glycol, propylene glycol-(1,3), butylene glycol-(1,4), and -(2,3), glycerol, hexanetriol-(1,2,6), butanetrio-(1,2,4), trimethylolpropane, trimethylolethane, pentaerythritol, mannitol, sorbitol and the like and polyethylene glycols, polypropylene glycols, polybutylene glycols and the like as disclosed in U.S. Pat. No. 3,201,372. The hydroxyl polyethers which are suitable for the invention are also known and can be prepared, for example, by the polymerization of epoxides such as ethylene oxide, propylene oxide, butylene oxide, styrene oxide, epichlorohydrin and the like, if desired with starting components which have reactive hydrogen atoms, such as alcohols or amines, e.g., glycerol, trimethylol propane, ethylene glycol, ammonia, ethanolamine and so on. Sucrose polyethers may also be used. Numerous representatives of the polyhydroxyl compounds which may be used in this invention are described, e.g., in Saunders and Frisch, *Polyurethanes, Chemistry and Technology*, Volumes I and II, Interscience Publishers 1962 and 1964 (page 32f Volume I and page 5 and page 198f Volume II) and in *Kunststoff-Handbuch*, Volume VII, Vieweg-Höchtlen, Publishers Carl Hanser Verlag, Munich 1966, e.g., on pages 45–71. Low molecular weight polyhydroxyl compounds, e.g., of the type already mentioned and/or chain lengthening agents such as glycols, diamines or water may also be used to a certain extent and are also disclosed in U.S. Pat. No. 3,201,372.

The organic polyisocyanates may be of any desired type, e.g., aliphatic, cycloaliphatic, araliphatic, aromatic, divalent and higher valent, including alkylene diisocyanates such as tetra- and hexa-methylene diisocyanate, arylene diisocyanates and their alkylation products such as phenylene diisocyanates, naphthylene diisocyanates, diphenylmethane diisocyanates, toluylene diisocyanates, di- and tri-isopropylene benzene diisocyanates, triphenylmethane triisocyanates, p-isocyanatophenyl-thiophosphoric acid triesters, p-isocyanatophenylphosphoric acid esters, aralkyldiisocyanates such as 1-(isocyanatophenyl)-ethyl isocyanate, the xylylene diisocyanates, polyisocyanates which have been substituted by all sorts of different substituents such as alkoxy, nitro, chlorine, bromine and the like, and polyisocyanates which have been modified with subequivalent quantities of polyhydroxyl compounds such as trimethylolpropane, hexanetriol, glycerol, butane diol, any of those suggested herein and so on. Suitable polyisocyanates also include those obtained from Schiff's bases of the general formula

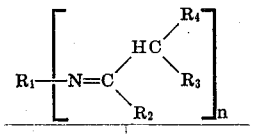

in which formula $R_1$ represents an n-valent $C_1$–$C_4$-alkyl radical such as methyl, ethyl, propyl, or butyl, an n-valent $C_5$–$C_7$-cycloalkyl radical such as cyclo pentyl, cyclohexyl or methyl cyclohexyl, an n-valent $C_6$–$C_{12}$-aryl radical such as phenyl, methyl phenyl, dimethyl phenyl, trimethyl phenyl, naphthyl, methyl naphthyl or dimethyl naphthyl or an n-valent $C_7$–$C_{11}$-aralkyl radical such as phenyl methyl, methyl phenyl methyl, dimethyl phenyl methyl or napthyl methyl which radicals may be interrupted by hetero atoms such as oxygen, nitrogen or sulphur, $R_2$ represents an aryl, cycloalkyl, aralkyl or aryl radical as defined above, $R_3$ and $R_4$ represent a hydrogen atom or an alkyl cyclo alkyl, aralkyl or aryl radical as defined above, $R_2$ and $R_3$ may together represent a 5- to 7-membered isocyclic or heterocyclic ring and $n$ represents an integer of 1 to 3. The polyisocyanates are obtained by reacting the Schiff's base at a temperature of −30° to 250° C. with polyisocyanates of the general formula $$R_5[-N= C =O]_x$$

in which $R_5$ is an $x$-valent alkyl, cycloalkyl, aralkyl or aryl group as defined above and $x$ is the integer 2 or 3.

Any of the polyisocyanates prepared by condensing aniline with formaldehyde followed by phosgenation are especially advantageous. Other examples include polyisocyanates masked with phenols, oximes or bisulphite, acetal-modified isocyanates, polymerized isocyanates containing isocyanurate rings, higher molecular weight polyisocyanates prepared by reacting monomeric polyisocyanates with higher molecular weight compounds containing reactive hydrogen atoms, preferably higher molecular weight polyhydroxyl compounds, polycarboxyl and polyamino compounds, and the like and mixtures thereof. Diphenylmethane diisocyanates which contain carbodiimide groups, such as those which can be prepared, e.g., according to German Pat. No. 1,092,007 may also be used as well as mixtures of different isocyanates.

Other components used in the practice of this invention include flame inhibiting substances of the type already known in the art which generally contain phosphorus and halogens either alone or in combination. In addition, other flame protective agents may be used, e.g., antimony compounds, bismuth compounds, boron compounds and the like. Further suitable flame protective agents known in the art are suggested in the chapter "Flammhemmende Substanzen" on pages 110 to 111 in *Kunststoff-Handbuch*, Volume 7, *Polyurethanes*, by Vieweg-Höchtlen, publishers Carl Hanser-Verlag, Munich 1966. Particularly suitable flame inhibiting substances are e.g., (a) phosphorus and nitrogen containing compounds such as

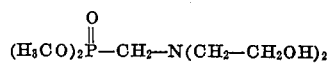

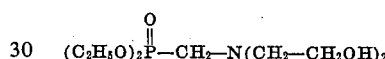

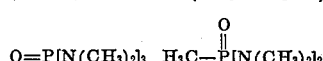

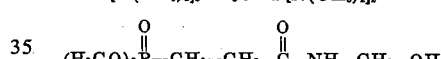

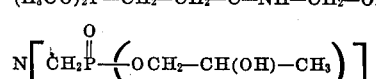

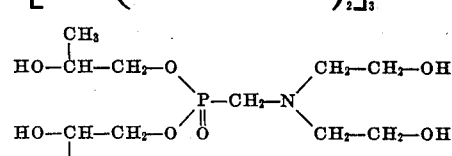

(b) phosphorus and halogen containing compounds such as $O=P(OCH_2-CH_2X)_3$   $X=Cl, Br$

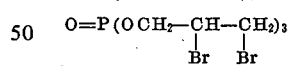

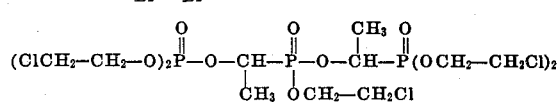

(c) phosphoric acid resp. phosphonic acid esters such as

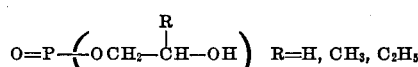

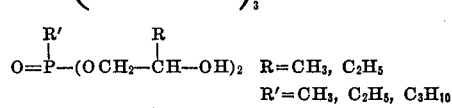

(d) halogen containing substances such as

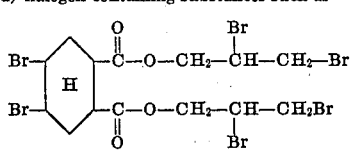

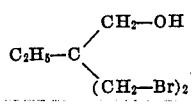

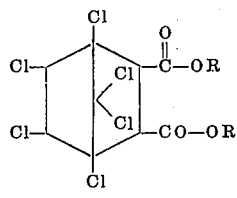
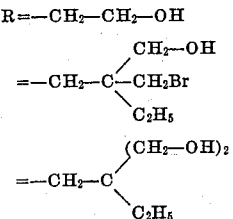

Hexabromcyclododecatrien

The flame inhibiting substances are generally included in quantities of 1 to 20 percent by weight, preferably 1 to 15 percent by weight, based on the quantity of isocyanate used.

The process of this invention is directed to the production of homogeneous polyurethanes, preferably polyurethane foams. In order to produce polyurethane foams, it is necessary to include water and/or other blowing agents in the reaction mixture. Some suitable blowing agents include, generally, alkanes, halogenated alkanes or low boiling solvents, e.g., methylene chloride, monofluorotrichloromethane, difluorodichloromethane, acetone and the like as well as those listed in U.S. Pat. No. 3,201,372 and mixtures thereof. Compounds which also liberate gases at elevated temperatures such as azo compounds may also be used as blowing agents. The production of synthetic resins which contain urethane groups, especially foam plastics, is otherwise carried out by processes which are known per se, either manually or mechanically, and known additives such as activators, emulsifiers, stabilizers, pigments and dyes and fillers, e.g., as listed in U.S. Pat. NO. 3,201,372, may be added. Suitable activators include tertiary amines such as triethylamine, dimethylbenzylamine, tetramethylene diamine, N-alkylmorpholines, organometallic salts such as stannous acylates, e.g., stannous dioctoate, dialkylstannic acylates such as dibutyl tin dilaurate, acetyl acetonates of heavy metals, e.g., of iron and so on. As emulsifiers one may use, for example, oxyethylated phenols, higher sulphonic acids, sulphonated castor oil, sulphonated ricinoleic acid, oleic acid ammonium salts and the like and mixtures thereof. Some suitable foam stabilizers include those based on polysiloxane-polyalkylene glycol copolymers, basic silicone oils and the like. Suitable emulsifiers, catalysts and additives are mentioned, e.g., in *Polyurethanes, Chemistry and Technology*, Volumes I and II, Saunders and Frisch, Interscience Publishers, 1962 and 1964, U.S. Pat. No. 3,201,372 and so on.

The quantities of polyisocyanate should, as a rule, be at least equivalent to the sum of the active hydrogen atoms present. Where foams are being produced using water as the blowing agent, appropriate quantities of additional polyisocyanates will be used according to the water content. Excess isocyanate groups in the reaction mixture, optionally in a foamable reaction mixture, can be built into the synthetic resin structure, preferably into a foam resin structure, in the form of isocyanurate groups and/or carbodiimide groups by the addition of, e.g., trivalent or pentavalent phosphorus compounds such as phospholidines, phospholine oxides, tertiary esters, amides or ester amides of phosphorus or phosphoric acid and the like and mixtures thereof.

The products of this invention may be used for many different purposes including the production of elastomers, coatings and impregnants prepared by any of the known methods, if desired, with the inclusion of inert solvents, polyesters, hydrocarbons, halogenated hydrocarbons and so on. It is preferred to use the process disclosed herein for the production of foam plastics. Such foam plastics have a wide range of application due to their flameproof nature, e.g., in the building industry as soundproof materials, for heat insulation, as packaging material for protection against shock and so on. The foam products of the instant process may be hard, semihard or flexible and can therefore also be used as upholstery material. The process of this invention may also be used to produce semihard molded polyurethane foams having a compact surface and cellular core which can be sued, for example, as crash pads in the automobile industry.

The invention is further illustrated but is not intended to be limited by the following examples in which all parts and percentages are by weight unless otherwise specified.

EXAMPLE 1 a. Preparation of the N-methylol Compounds

A. A mixture of about 1,900 parts of paraformaldehyde and about 12.5 parts of magnesium oxide is slowly introduced into a melt of about 1,180 parts of acetamide and the reaction mixture is heated at about 100° C. for about 10 hours. About 2,806 parts of a clear liquid is formed in the process and is separated from the solid inorganic constituents.

B. A mixture of about 8 parts of potassium carbonate and about 500 parts of paraformaldehyde is slowly introduced into about 356 parts of molten ethyl carbamate and the reaction mixture is heated at about 100° C. for about 4 hours. After removal of the solid inorganic constituents, about 657 parts of a clear liquid are obtained.

C. About 855 parts of p-toluenesulphonamide and about 1,215 parts of an aqueous formaldehyde solution (40 volume percent) are heated at about 100° C. for about 1 hour. The water is distilled off in vacuo. About 900 parts of a viscous oil are obtained.

D. Analogous addition products are prepared as described in A (a) substituting equivalent quantities of butyramide or stearoylamide for the acetamide or (b) substituting equivalent amounts of acetaldehyde, butyraldehyde or azelaic aldehyde for the p-formaldehyde.

b. Process of the Invention

About 40 parts of monofluorotrichloromethane, about 2 parts of permethylated N-(b-aminoethyl)-piperazine and about 1 part of a copolymer of polysiloxane and polyalkylene glycol are added to a mixture of about 70 parts of a polyester having an OH number of 390 which has been prepared from adipic acid and phthalic acid, trimethylolpropane and diethyleneglycol, about 30 parts of a flame protective agent which has the structure

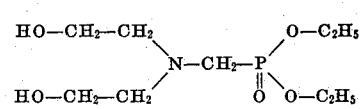

about 20 parts of trichloroethylphosphate and about 10 parts of the N-methylol compound of (a) A. This mixture is intensively stirred together with about 118 parts of a polyphenyl-polymethylene-polyisocyanate obtained by aniline-formaldehyde condensation followed by phosgenation, which comprises 3.2 percent by weight of 2,2'-diisocyanato diphenyl methane, 5,1 percent by weight of 2,4'-diisocyanato diphenyl methane, 49,0 percent by weight of 4,4'-diisocyanato diphenyl methane, 18,2 percent by weight of trinuclear compounds and 5,7 percent by weight of tetranuclear compounds and after about 20 seconds it is poured into paper molds. After about 2 minutes a hard foam is formed which has the following properties:

| | |
|---|---|
| Bulk density | 27 kg./m.³ |
| Compression strength | 1.9 kg. wt./cm.² |
| Impact strength | 0.2 cm. kg. wt./cm.² |
| Dimensional stability at −30° C. | dimensionally stable |
| Combustion test according to ASTM-D 1692 | noncombustible |
| Complete combustion time in the Torch test | 106 seconds | c. Comparison Test

If the process is carried out as described in (b) but without the N-methylol compound of (a) A (in which case the quantity of polyisocyanate used is reduced to 100 parts), a foam plastic is obtained which has the following properties:

| | |
|---|---|
| Bulk density | 30 kg./m.³ |
| Compression strenth | shrunk before the compression test |
| Impact strength | 0.3 cm. kg. wt./cm.² |
| Dimensional stability at −30° C. | not dimensionally stable |

EXAMPLE 2

A mixture of about 80 parts of a polyether obtained from sucrose and propylene oxide and having an OH number of 380, about 20 parts of a flame protective agent having the formula

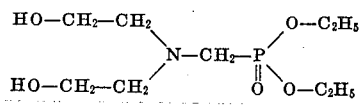

about 10 parts of trichloroethylphosphate and about 10 parts of the N-methylol compound of Example 1 (a) A is stirred together with about 40 parts of monofluorotrichloromethane, about 2 parts of permethylated N-(b-aminoethyl)-piperazine and about 1 part of a copolymer of polysiloxane and polyalkylene glycol. After the addition of about 104 parts of the polyisocyanate described in Example 1, the foamable reaction mixture is stirred for about one-half minute and then poured into a paper mold. The resulting hard foam plastic has the following properties:

| | |
|---|---|
| Bulk density | 26 kg./m.³ |
| Compression strength | 1.6 kg. wt./cm.² |
| Impact strength | 0.2 cm. kg. wt./cm.² |
| Combustion test according to ASTM-B 1692 | noncombustible |
| Complete combustion time in the Torch test | 205 seconds |

Comparison Test

If the process is carried out as described in Example 2 but without the N-methylol compound (in which case the quantity of polyisocyanate used is reduced to about 94 parts), a hard foam plastic is obtained which has the following properties:

| | |
|---|---|
| Bulk density | 29 kg./m.³ |
| Compression strength | 1.5 kg./wt./cm.² |
| Impact strength | 0.3 cm. kg. wt./cm.² |
| Combustion test according to ASTM-D 1692 | noncombustible |
| Complete combustion time in the Torch test | 148 seconds |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. A flame resistant polyurethane prepared from an organic polyisocyanate, a compound containing at least two hydrogen atoms reactive with NCO groups and a flame retarding additive, which polyurethane contains from about 1 to about 20 percent by weight based on the quantity of the organic polyisocyanate of a N-methylol compound having the structure:

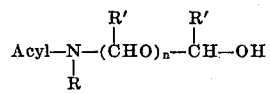

in which the acyl radical is

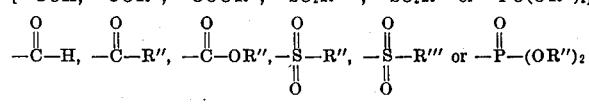

wherein R'' is an alkyl radical having 1 to 18 carbon atoms, R''' is an aryl radical having six to 14 carbon atoms, R and R' are hydrogen or an alkyl radical having one to four carbon atoms and $n$ is an integer of 1 to 3.

2. The polyurethane of claim 1 having a cellular structure.

3. The polyurethane of claim 1 wherein the N-methylol compound is prepared from paraformaldehyde and acetamide.

4. The polyurethane of claim 1 wherein the N-methylol compound is prepared from paraformaldehyde and ethyl carbamate.

5. The polyurethane of claim 1 wherein the N-methylol compound is prepared from formaldehyde and p-toluene sulfonamide.

6. The polyurethane of claim 1 wherein the flame retarding additive has the structure

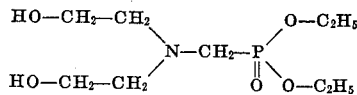

7. The polyurethane of claim 1 wherein the N-methylol compound is present in an amount of from about 1 to about 15 percent by weight based on the organic polyisocyanate.

* * * * *